United States Patent
Wagner et al.

[15] 3,672,270
[45] June 27, 1972

[54] PHOTOGRAPHIC APPARATUS WITH BUILT-IN ELECTRICAL MOVING-COIL MEASURING INSTRUMENT

[72] Inventors: Karl Wagner, Ottobrunn; Josef Ganser, Munich, both of Germany

[73] Assignee: AGFA-Gevaert Aktiengesellschaft, Leverkusen, Germany

[22] Filed: Jan. 26, 1971

[21] Appl. No.: 109,812

[30] Foreign Application Priority Data

Jan. 30, 1970 Germany ....................P 20 04 261.9

[52] U.S. Cl. .............................95/11 L, 95/10 C, 240/1.3, 324/41
[51] Int. Cl. ..............G03b 17/18, G03b 17/20, G03b 15/03
[58] Field of Search .............95/11, 11 V, 11 L, 11.5, 10 C, 95/10 CE; 240/1.3; 324/41, 157; 340/280

[56] References Cited

UNITED STATES PATENTS 3,541,438  11/1970  Wadley et al. .........................324/41 X
3,130,657  4/1964  Schmuck..............................95/10 C

*Primary Examiner*—Samuel S. Matthews
*Assistant Examiner*—Robert P. Greiner
*Attorney*—Michael S. Striker

[57] ABSTRACT

A photographic camera with a built-in exposure control assembly which utilizes a moving-coil electrical measuring instrument with a permanent magnet located without the coil. The measuring instrument is provided with two conductors consisting of magnetically conductive material and having pole shoes flanking the coil, median portions abutting against the poles of the permanent magnet and outer end portions which are accessible from without the housing of the camera and can attract a magnetically conductive yoke forming part of a flash unit or another camera accessory which is to be separably attached to the camera housing in a selected position. The coil has a pointer which is provided with a flag movable into and out of registry with a window in the view finder of the camera. The permanent magnet can influence the coil in such a way that the flag appears behind the window only when the yoke of the accessory is attracted by the outer end portions of the conductors. Alternatively, the coil can be influenced by the permanent magnet in such a way that the flag moves behind the window not only when the yoke abuts against the outer end portions of the conductors but also when the intensity of scene light decreases below a certain minimum value which is indicative that the camera cannot make satisfactory exposures at the prevailing scene brightness.

13 Claims, 2 Drawing Figures

PATENTED JUN 27 1972 3,672,270

INVENTOR
KARL WAGNER
JOSEF GANSER

BY
Attorney

3,672,270

PHOTOGRAPHIC APPARATUS WITH BUILT-IN ELECTRICAL MOVING-COIL MEASURING INSTRUMENT

BACKGROUND OF THE INVENTION

The present invention relates to photographic apparatus in general, and more particularly to improvements in photographic apparatus with built-in electrical measuring instruments of the type employing a moving coil.

It is well known to employ in a photographic camera an electrical moving-coil measuring instrument, for example, for the purpose of automatically adjusting the shutter and/or the diaphragm as a function of the scene brightness. A drawback of such cameras is that, when compared with its cost and its space requirements, the measuring instrument does not contribute sufficiently to the versatility and utility of the camera.

SUMMARY OF THE INVENTION

An object of the invention is to provide a photographic apparatus, particularly a still camera, with a novel and improved electrical moving-coil measuring instrument which can perform one or more novel functions in addition to or instead of such functions which are expected from a moving-coil measuring instrument in a conventional camera.

Another object of the invention is to provide a camera with a moving-coil electrical measuring and indicating instrument which is used to greater advantage than the measuring instruments of presently known cameras and/or which can be used for the presently known purposes as well as to perform at least one additional function which contributes to versatility of the camera and to simplicity and reliability of its operation.

A further object of the invention is to provide an electrical moving-coil measuring instrument which is capable of indicating to the user the presence or absence of one or more additional or auxiliary camera components or accessories which might be desirable or necessary for the making of exposures under certain circumstances.

In accordance with a feature of the invention, the improved photographic apparatus comprises a housing or body and a novel electrical moving-coil measuring instrument which preferably forms part of a built-in exposure control assembly for automatic determination of exposure time and/or aperture size as a function of scene brightness. The measuring instrument comprises a moving coil which carries a pointer or an analogous indicator, a permanent magnet which is mounted in the housing without the coil, and a pair of conductors consisting of magnetically conductive material and having first portions which constitute two pole shoes and are adjacent to the coil, second portions which abut against the poles of the permanent magnet, and third portions which are accessible from without the housing. The third portions can abut against and then attract a support which consists of magnetically conductive material and forms a base or yoke of a camera accessory, for example an illuminating arrangement in the form of a flashlamp unit or an electronic flash. Thus, the permanent magnet can cooperate with the conductors to attract and separably hold the accessory in a desired position. Furthermore the permanent magnet can influence the coil in such a way that the pointer can be seen from without the housing when the accessory adheres to the conductors.

The novel features which are considered as characteristic of the invention are set forth in particular in the appended claims.

The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
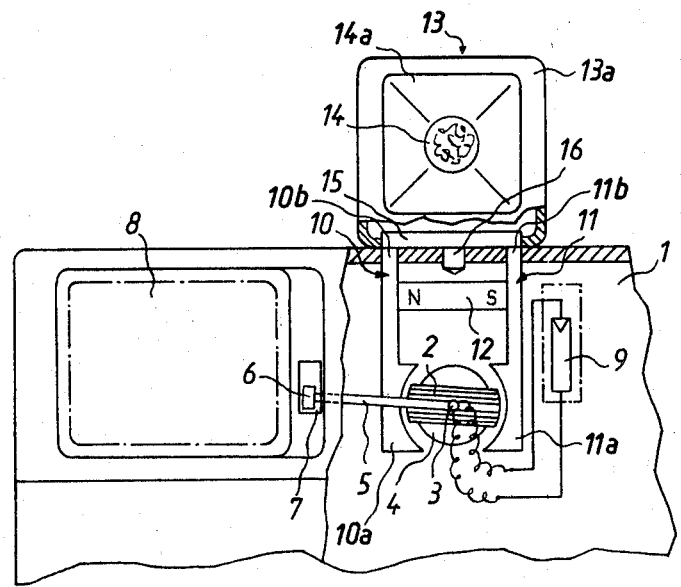
FIG. 1 is a fragmentary partly elevational and partly vertical sectional view of a photographic apparatus which embodies one form of the invention and wherein proper attachment of an accessory results in movement of an indicator to an exposed position in which it can be seen by the user of the apparatus.

Referring first to FIG. 1, the upper portion of a camera housing or body 1 has an internal chamber for an electrical moving-coil measuring instrument having a moving coil 2 turnable about the common axis of two bearings 3 (only one shown). The soft iron core of the instrument is shown at 4 and the numeral 5 denotes a pointer or indicator having an end portion 6 which constitutes a flag, e.g., a red flag. The flag 6 is movable behind and is observable in certain angular positions of the coil 2 through a window 7 which is provided in the view finder 8. The terminals of the coil 2 are connected with a photoelectric receiver 9 (preferably a cell) which is exposed to scene light.

The reference characters 10 and 11 denote two conductors which consist of magnetically conductive material and have inner end portions 10a, 11a which form pole shoes and flank the soft iron core 4 from opposite sides. The median portions of the conductors 10, 11 are connected with the poles of a permanent magnet 12 which is mounted in the interior of the camera body 1 but without the coil 2, and the upper or outer end portions 10b, 11b of the conductors 10, 11 extend through the top wall of the body 1.

FIG. 1 further illustrates an illuminating arrangement 13 which constitutes a camera accessory connectable to and disconnectable from the body 1. The illuminating arrangement 13 of FIG. 1 is a flash unit having a flash bulb 14 (e.g., a flashtube which can be fired many times to produce short flashes of artificial light for illumination of a scene or subject) located in front of a suitable reflector 14a. The lower portion of the casing 13a of the flash unit 13 is provided with a base or support 15 here shown as a yoke consisting of magnetically conductive material and movable into contact with the outer end portions 10b, 11b of the conductors 10, 11 whereby the flash unit 13 is automatically attached to and held on the camera body 1 in a selected position in which the flashtube 14 faces in a desired direction. The casing 13a of the flash unit 13 can be further provided with a guide pin 16 which can enter a recess or socket in the top wall of the body 1 when the flash unit 13 is properly mounted on the camera. It was found that a reasonably strong permanent magnet 12 is capable of properly retaining a flash unit 13 so that the latter need not be positively or frictionally held on the camera body 1, provided that the area of exposed surfaces of the outer end portions 10b, 11b is sufficiently large to insure proper attraction of the base 15. This renders it possible that the flash unit 13 can be rapidly attached to or detached from the camera, merely by overcoming the attraction between the conductors 10, 11 and the base 15. It will be noted that the conductors 10, 11 can replace a conventional accessory shoe which invariably extends beyond the outline of the camera body whereas the outer end portions 10b, 11b of the conductors need not project beyond the exposed surface of the top wall of the body 1. Thus, the permanent magnet 12 of the measuring instrument can be used as a means for yieldably retaining a piece of auxiliary equipment in a desired operative position.

When the flash unit 13 is properly attached to the camera body 1 in a manner as shown in FIG. 1, the magnetic circuit of the permanent magnet 12 is completed by way of the conductors 10, 11 and base 15. Therefore, only a small portion of the magnetic flux passes through the coil 2 of the measuring instrument and the coil 2 then maintains the pointer 5 in such angular position that the flag 6 is visible behind the window 7 of the view finder 8. This indicates to the user that the camera is ready to make exposures with artificial illumination of the subject.

If the user thereupon decides to detach the flash unit 13, the magnetic flux of the permanent magnet 12 exerts a much stronger influence on the measuring instrument whereby the coil 2 assumes an angular position in which the flag 6 is moved out of registry with the window 7. This indicates to the user that the camera is ready to make exposures without artificial illumination of the subject. The arrangement is preferably such that the magnetic flux produced by the permanent magnet 12 is capable of causing the coil 2 to move the flag 6 out of registry with the window 7 only when the intensity of scene light (as detected by the photosensitive receiver 9) is sufficient for the making of satisfactory exposures or for the making of satisfactory exposures with the camera body 1 held by hand (i.e. without camera shake). When the intensity of scene light is unsatisfactory for exposures with artificial illumination or for exposures without artificial illumination while the camera body is being held by hand, the minimal current flowing through the coil 2 cooperates with the magnetic flux produced by the permanent magnet 12 to maintain the flag 6 in registry with the window 7 so as to inform the user that the camera is not ready for the making of exposures without artificial illumination of the subject or without a tripod or a similar support.

It is clear that the outer end portions 10b, 11b of the conductors 10, 11 can serve with equal advantage to detachably connect to the camera body 1 one or more other pieces of auxiliary or accessory equipment, as long as the equipment to be attached is provided with a support which corresponds to or is similar to the support 15 of the flash unit 13.

If the flag 6 is not visible when the flash unit 13 is attached to the camera body 1, the user knows that the flash unit is not needed, i.e., that the camera can make satisfactory exposures without artificial illumination of the subject or scene.

Figure 2:
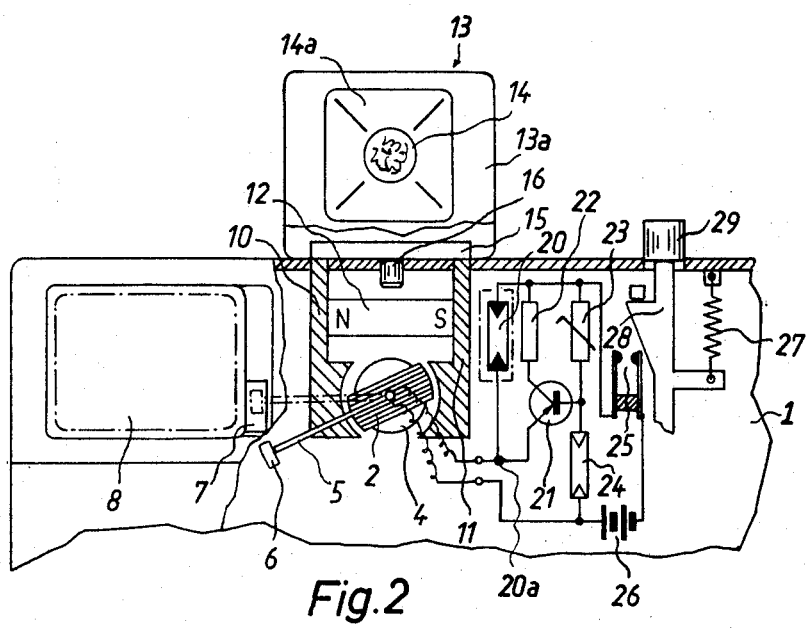
FIG. 2 is a similar fragmentary partly elevational and partly vertical sectional view of a second photographic apparatus wherein an indicator is caused to appear only when the conditions are unsatisfactory for the making of acceptable exposures.

For convenience of comparison, certain parts of the structure shown in FIG. 2 are denoted by numerals similar to those indicating identical or analogous parts of the structure shown in FIG. 1 One of the differences between the two structures is that the body 1 of the camera shown in FIG. 2 contains a photoresponsive resistor 20 which replaces the photoelectric cell 9 of FIG. 1 and is in series with the coil 2. A tap 20a between the coil 2 and resistor 20 is connected with the emitter of a transistor 21. The collector circuit of the transistor 21 contains a resistor 22. The transistor 21 can connect the resistor 22 in parallel with the photoresponsive resistor 20. The base of the transistor 21 is connected with a junction between the elements of a voltage divider including a variable resistor 23 and a second photoresponsive resistor 24. The electric circuit of the structure shown in FIG. 2 can be completed by a master switch 25 one contact of which is connected with one pole of an energy source 26. The switch 25 can be closed by a release element 28 which is provided with a depressible know 29 normally extending beyond the top wall of the camera body 1 under the action of a relatively strong return spring 27.

The conductors 10, 11 are configured and mounted in the same way as shown in FIG. 1, and the flash unit 13 of FIG. 2 is assumed to be identical with the flash unit of FIG. 1.

When the flash unit 13 is properly attached to the camera body 1 so that the base 15 is attracted by the outer end portions of the conductors 10, 11, the magnetic circuit of the permanent magnet 12 is completed by way of the conductors 10, 11 and the base 15 of the flash unit 13. Thus, the coil 2 is influenced by a relatively small portion of the magnetic flux and the flag 6 of the pointer 5 is then maintained in a starting position which is shown by solid lines and in which the flag is out of registry with the window 7 of the view finder 8. The pointer 5 causes the flag 6 to assume such solid-line position independently of whether or not the intensity of scene light is satisfactory for the making of exposures without artificial illumination. Thus when the flash unit 13 is properly attached to the body 1, the flag 6 is not seen by a person looking through the view finder 8.

If the flash unit 13 is detached, the magnetic flux of the permanent magnet 12 is fully effective to influence the angular position of the coil 2. It is assumed that the flash unit 13 is detached from the outer end portions of the conductors 10, 11 and that the user of the camera wishes to make an exposure and exerts pressure on the knob 29 to move the release element 28 downwardly, as viewed in FIG. 2. A triangular cam of the release element 28 closes the switch 25 so that the energy source 26 is connected in circuit with the coil 2, transistor 21 and resistors 20, 22, 23, 24. If the intensity of scene light is weak, the resistance of the resistor 24 (which is exposed to scene light) is very high so that the transistor 21 conducts to thereby connect the resistor 22 in parallel with the resistor 20. The resistance of the resistor 20 (which is also exposed to scene light) is high so that the current which flows through the coil 2 is determined by the resistance of the resistor 22. Thus, the angular position of the pointer 5 is a function of the resistance of the resistor 22. This angular position is selected in such a way that the flag 6 is observable behind the window 7 (see the phantom-line position of the flag 6 in FIG. 2) to inform the user that the intensity of scene light is unsatisfactory. The user is then informed that the flash unit 13 must be attached prior to the making of an exposure. The transistor 21 constitutes a control switch which responds to a certain resistance of the resistor 24 to connect the resistor 22 in parallel with the resistor 20.

If the knob 29 is depressed at a time when the intensity of scene light is satisfactory for the making of exposures without artificial illumination of the subject or scene, the resistance of the resistor 24 is low and the transistor 21 blocks so that the resistor 22 is not connected in parallel with the resistor 20. The latter then determines the current which flows through the coil 2. The flag 6 is then caused to move out of registry with the window 7 to thereby indicate to the user that the intensity of scene light is satisfactory. The exposure is thereupon made in response to a further depression of the knob 29 in a manner not forming part of the present invention.

If desired, the measuring instrument including the coil 2 of FIG. 1 or 2 can further serve to effect automatic adjustment of at least one exposure value (aperture size or exposure time) as a function of scene brightness. To this end, the position of the pointer 5 can be detected by a customary scanning device which is released to the action of a spring in response to depression of the release element 28 so that the scanning device moves to a position which is a function of the position of the pointer 5 and automatically adjusts the shutter and/or the diaphragm in dependency on the angular position of the pointer. The scanning device is preferably arrested in its starting or inoperative position in response to proper attachment of the flash unit 13 or another suitable illuminating device so that the aperture size and/or the exposure time for the making of exposures with artificial illumination of the subject or scene need not be influenced by the intensity of scene light. For example, the pointer 5 (in its starting position) can serve to block the movement of scanning device from its inoperative position when the flash unit 13 is held in the position shown in FIG. 1 or 2. Such arrangement exhibits the advantage that the camera need not be provided with separate means for holding the scanning device in the inoperative position when the exposures are to be made with artificial illumination of the subject.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, a combination comprising a housing; an electric measuring instrument comprising a moving coil rotatably mounted in said housing, a permanent magnet mounted in said housing externally of said coil, and a pair of conductors consisting of magnetically conductive material and having first portions constituting pole shoes and being outwardly adjacent to said coil, second portions adjacent to said permanent magnet whereby the magnetic flux of said magnet normally tends to maintain said coil in a first angular position, and spaced third portions accessible from without said housing; and an accessory having a support consisting of magnetically conductive material and being movable into abutment with the third portions of said conductors so as to provide with said permanent magnet and said conductors a closed path for magnetic force lines whereby the influence of said magnetic flux upon said coil is changed and the coil is normally free to assume a second angular position.

2. A combination as defined in claim 1, wherein said conductors and said permanent magnet constitute a means for separably holding said accessory in a predetermined position with reference to said housing when said support abuts against the third portions of said conductors.

3. A combination as defined in claim 1, further comprising an observation window provided in said housing, said measuring instrument further comprising an indicator receiving motion from said coil and having a portion which registers with and is observable behind said window when said support abuts against the third portions of said conductors.

4. A combination as defined in claim 3, wherein said portions of said indicator is a flag.

5. A combination as defined in claim 3, wherein said window forms part of a view finder.

6. A combination as defined in claim 1, further comprising photosensitive receiver means exposed to scene light and connected with said coil to influence the positions of the coil as a function of scene brightness.

7. A combination as defined in claim 1, wherein said accessory is an illuminating arrangement having means for artificially illuminating a selected subject or scene.

8. A combination as defined in claim 1, further comprising photoresponsive means exposed to scene light and connected with said coil to influence the positions of the coil as a function of scene brightness, said measuring instrument further comprising indicator means which is observable from without said housing when the intensity of scene light is below a predetermined minimum value.

9. A combination as defined in claim 8, wherein said indicator means is also observable from without said housing when said support abuts against the third portions of said conductors.

10. A combination as defined in claim 1, wherein said measuring instrument forms part of a built-in exposure control assembly.

11. A combination as defined in claim 10, wherein said exposure control assembly further comprises a photoresponsive resistor connected in series with said coil to influence the positions of said coil as a function of scene brightness when such brightness exceeds a predetermined value, a second resistor, and circuit means for connecting said second resistor in parallel with said photoresponsive resistor in response to a decrease of scene brightness below said predetermined value.

12. A combination as defined in claim 11, wherein said circuit means comprises a transistor, said second resistor being connected in the collector-emitter circuit of said transistor, said circuit means further comprising a voltage divider connected with the base of said transistor and including a third resistor and a second photoresponsive resistor exposed to scene light.

13. A combination as defined in claim 12, wherein said second resistor has a predetermined resistance so as to effect a movement of said coil to a predetermined position when the scene brightness decreases to below said predetermined value so that said second resistor is connected in parallel with said first mentioned photoresponsive resistor.

* * * * *